April 1, 1969     P. G. RACINE     3,436,002
SHEET-TREATING ROLL APPARATUS
Filed Feb. 16, 1967     Sheet _1_ of 5
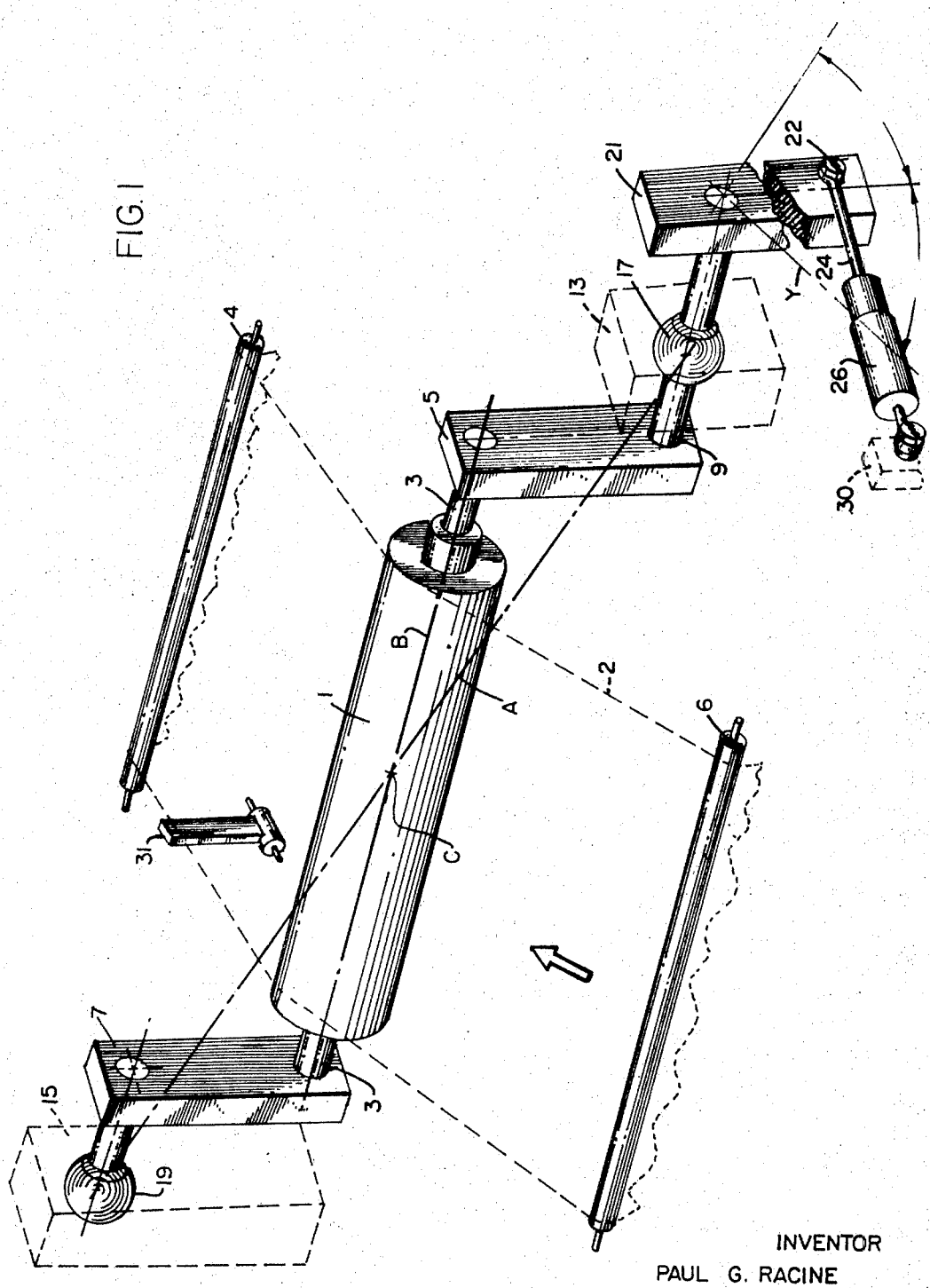
INVENTOR
PAUL G. RACINE
BY,
Kenway, Jenney & Hildreth
ATTORNEYS

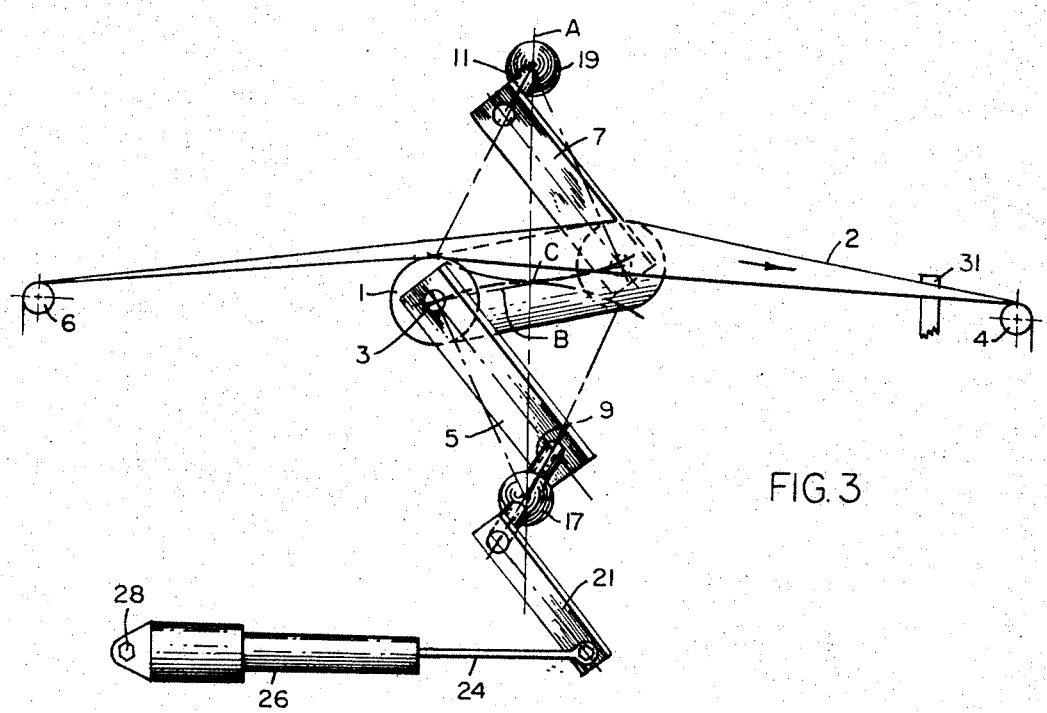
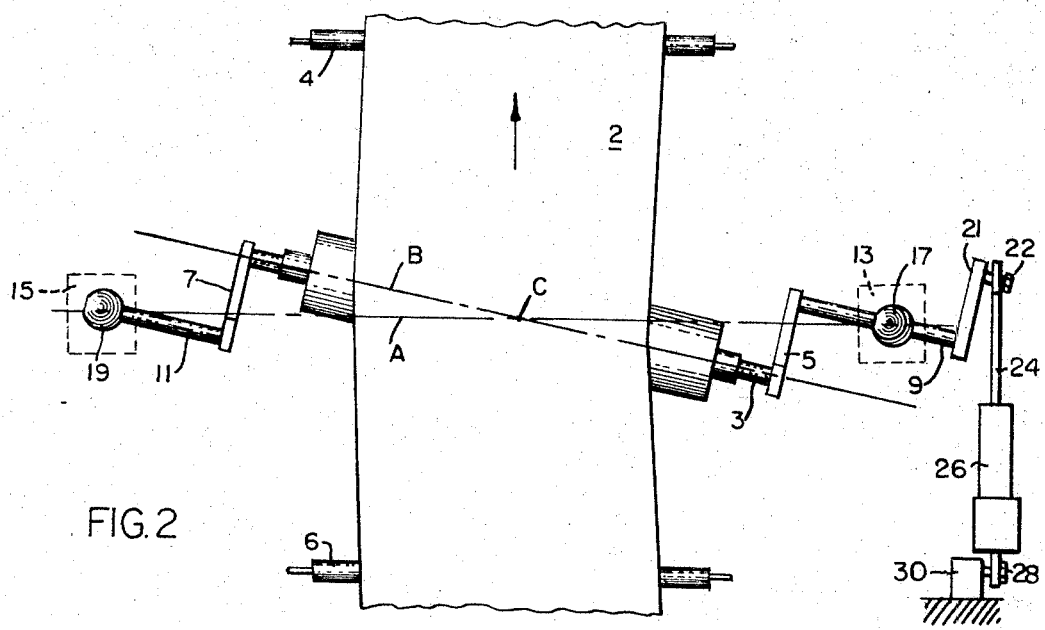

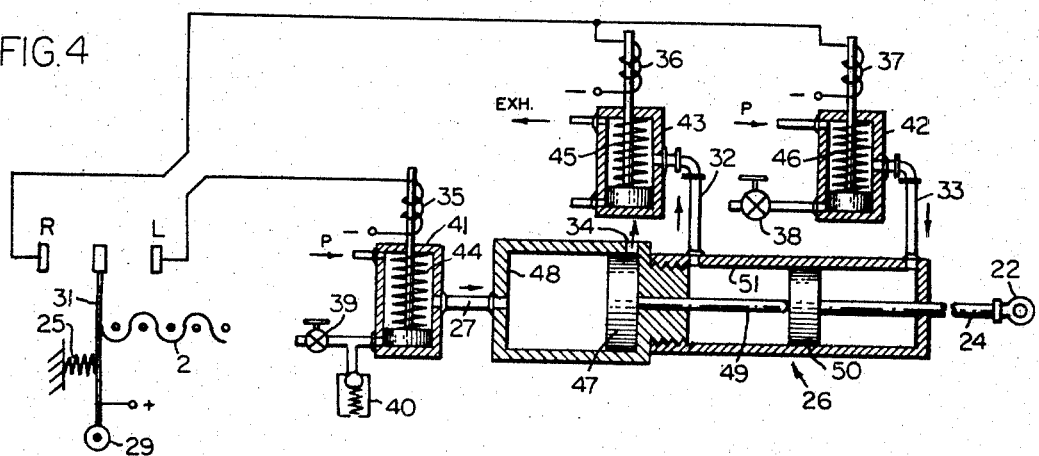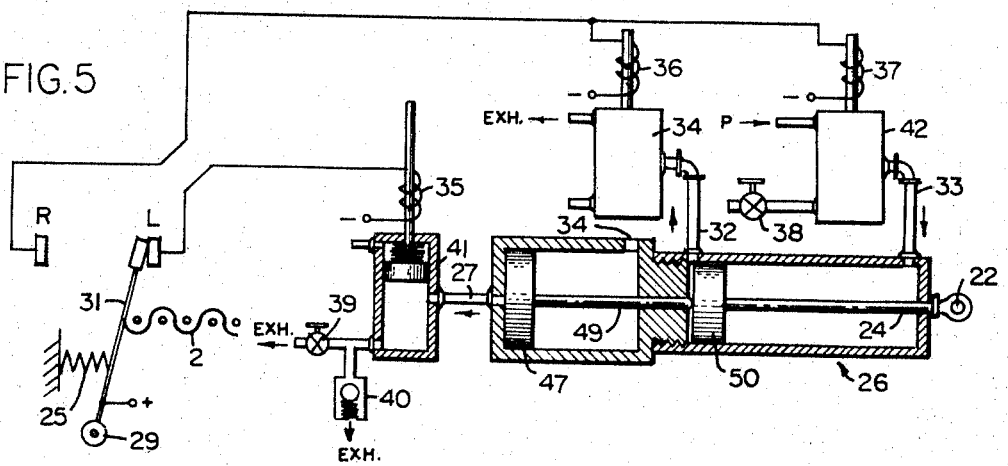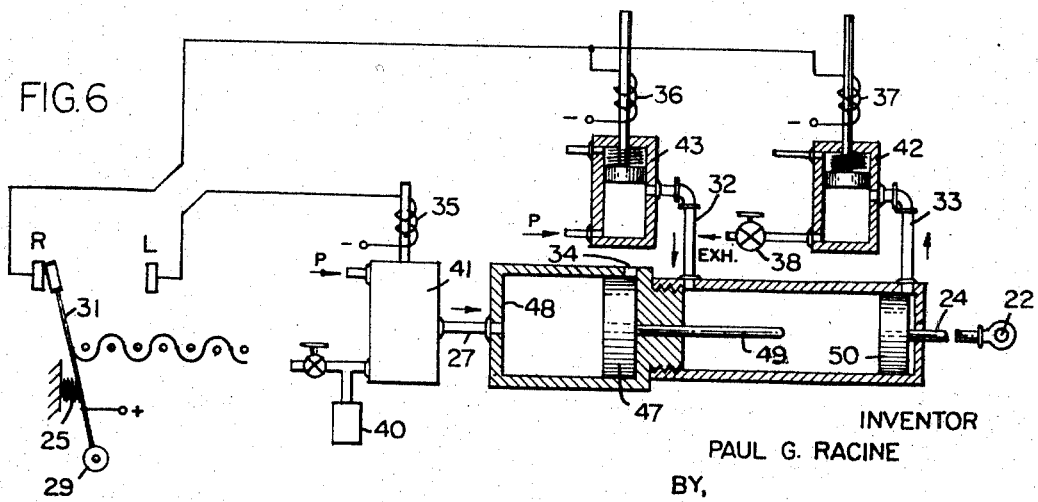

United States Patent Office 3,436,002
Patented Apr. 1, 1969

3,436,002
SHEET-TREATING ROLL APPARATUS
Paul G. Racine, Taunton, Mass., assignor to Mount Hope Machinery Company, Taunton, Mass., a corporation of Massachusetts
Filed Feb. 16, 1967, Ser. No. 616,724
Int. Cl. B65h 25/26
U.S. Cl. 226—23
9 Claims

ABSTRACT OF THE DISCLOSURE

A roll apparatus for treating travelling sheet or web material, to guide a sheet in a fixed path, or to straighten the weft elements of a web. The ends of a roll are mounted on opposed crank arms for rocking adjustment about an axis tilted from the roll axis, either to change the angle of sheet encounter for guiding, or to stretch a web differentially for weft-straightening. Also snap-acting positioners for adjusting the roll.

Background of the invention

It is conventional to guide sheet materials by means of one or more rolls about which a travelling sheet is partially wrapped. The rolls normally extend at right angles to the direction of sheet travel. By tilting the rolls from this neutral position, the sheet is caused to crawl laterally along them, thus changing its path.

The copending application of George P. Knapp, Ser. No. 496,244, filed Oct. 4, 1965, now Patent No. 3,380,637, for "Improvements in Sheet-Guiding Apparatus" describes a sheet guider of a snap-acting type. In this guider, lateral displacement of the sheet immediately tilts a guider roll from a neutral position to a corrective position at a fixed angle of tilt, without consideration of the magnitude of the error. The roll is returned to the neutral position with a snap action immediately upon the return of the sheet to its proper path.

Snap-acting guiding has the advantage of the reducing the tendency to overcorrect sheet-position errors, which is characteristic of those prior systems which tilt the guider rolls at a moderate angular velocity in an effort to avoid tilting the roll to a limiting angle greater than may prove necessary to correct a given error. The shortcomings of such a system are that a large error is sufficiently responded to relatively late; and that a slow return to neutral often results in over-correction and a subsequent hunting action. The intention of avoiding over-correction defeats itself by this solution.

Summary of the invention

It is the primary objetc of the present invention to provide a sheet-treating roll apparatus of improved construction. It is a feature of the invention that a sheet-treating roll is supported effectively as though it were pivoted at its center, without entailing the massive structure necessary to provide direct support at that point. The roll remains in neutral equilibrium regardless of its angular position with respect to the sheet; that is, the tension in the sheet does not produce an unbalanced moment tending to move the roll from its adjusted position, whatever the angle at which the sheet approaches and leaves it.

The apparatus of the present invention is particularly adapted to the snap-acting mode of guider operation. It is another object of this invention to provide an improved roll-positioning system for snap-acting guider operation, which is useful not only in combination with my improved apparatus, but also with other known types of guiders.

In a preferred embodiment of my improved apparatus, I utilize a conventional straight roll rotatably mounted on a shaft, and fix the ends of the shaft in a pair of arms which extend transversely from the shaft axis in opposite directions. The arms and shaft form a crank unit. The arms are supported at their extremities in self-aligning bearings so that the crank unit is rotatable about a bearng axis which is inclined to the shaft axis, and preferably passes through the longitudinal center of the roll so that the unit is in neutral equilibrium for angular positioning about the bearing axis.

In use as a guider, a positioning system is provided for adjusting the unit about the bearing axis in response to the location of the sheet. In a neutral position, the shaft axis is parallel to the planes in which the sheet normally travel, and extends perpendicularly to the direction of sheet travel so that there is no guiding effect. Sensing means, which may be a pivoted finger engaging an edge of the travelling sheet, actuate the positioning system when the sheet deviates from its normal path beyond tolerance limits; the arm-and-shaft unit is swung about the bearing axis to tilt the roll at an angle to the direction of sheet travel, and thus institute corrective guiding action. Immediately after the sheet returns within the violated tolerance limit, the arm-and-shaft unit is swung back to the neutral position.

This apparatus may also be used where it is desired to stretch a web differentially, as is done in a weft straightener to correct a skewed condition. In such a case, a large wrap angle would ordinarily be used and the threading would be such that the bisector of the angle formed between the entering and leaving web would be substantially perpendicular to the cranks when the roll was in its neutral position.

An improved snap-action guider positioning system includes a double-cylinder actuator and a control arrangement adapted to swing the arm-and-shaft unit to either of two predetermined angular positions of opposite senses, depending on the direction that the sheet has drifted from the proper path. The system applies uniform tilting force when moving either to or from the neutral position; but the rate of tilting from neutral may be controlled at a value somewhat less than the maximum rate which is used for restoring the roll to neutral. Reducing the tilting rate avoids moving the roll all the way to the limiting position for a deviation of short duration, which would also tend to be a relatively small deviation, thus avoiding excessive or unnecessarily large swings of the guiding roll and allowing it to be returned as quickly as possible to neutral; while more presistent and generally larger errors allow the roll to reach its limiting tilted position to provide the fastest possible correction rate. An appropriate compromise is easily worked out in practice. But whether a deviation be large or small, it is desirable to restore the roll to neutral as quickly as feasible after correction.

It will be understood that since the ends of the shaft move in circular paths about the arm bearings, a corrective displacement of the roll also involves tilting perpendicular to the sheet surface, forcing one end of the roll into it and pulling the other end away. This changes the path lengths of the sheet edges, and therefore has a tendency to cause a differential stretching which may not be acceptable when guiding some materials travelling under substantial tension. However, this effect is avoided entirely in another embodiment of the invention, using two guide rolls which engage the sheet serially, and whose ends are mounted in parallel pairs of interconnected arms so that the rolls tilt together and remain in parallelism. The sheet passes over one roll and under the next, and the two substantially compensate to maintain a uniform path length for every longitudinal element of the sheet.

Brief description of the drawings

While the specification concludes with claims particularly pointing out the subject matter which I regard as my invention, it is believed that a clearer understanding may be gained from the following detailed description of preferred embodiments thereof, referring to the accompanying drawings, in which:

FIGURE 1 is a fragmentary schematic view of a first form of the roll apparatus, in use as a guider;

FIGURE 2 is a schematic plan view illustrating the guider of FIGURE 1 in one operative position;

FIGURE 3 is a schematic end view of the guider in the position of FIGURE 2;

FIGURES 4, 5 and 6 are diagrams showing a position-control system in various operational positions;

Figure 7:
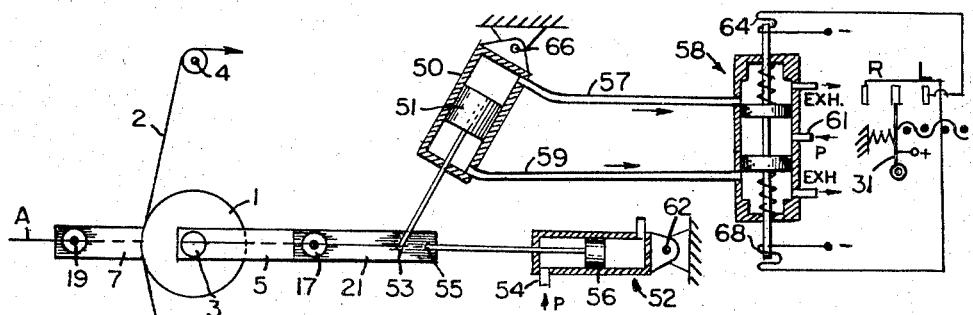
FIGURES 7, 8 and 9 are schematic end views showing a modified position-control system and roll apparatus in various operational positions.

Referring first to FIGURES 1–3, one form of the improved apparatus employs a straight roll 1 of a conventional type, for engaging a travelling sheet 2. The sheet is fed to and from the roll 2 by fixed plain rolls 4 and 6 or other suitable means, so that it passes with an appropriate angle of wrap arcuately over the surface of the roll. A nonrotating shaft 3 mounts the roll for rotation about its longitudinal axis B by means of suitable bearings (not shown) spaced along the shaft in a conventional manner.

Arms 5 and 7 are fixed to the opposite ends of the shaft by means such as set screws (not shown), and extend transversely to the shaft axis with opposite components of direction, i.e., at an angle of more than 90° to one another; and preferably in diametrially-opposed relation as shown. These arms terminate in a pair of stub shafts 9 and 11, which carry spherical bearings 17 and 19; these are supported in fixed posts 13 and 15 forming a portion of a stationary frame of the guider. One of the stub shafts 9 protrudes through the post 13 and has a positioning arm 21 affixed at its end. This arm in turn is pivotally connected at 22 to the piston rod 24 of a double-cylinder actuator 26 which will be described in detail in connection with FIGURES 4–6. The actuator is pivotally mounted at 28 on a structural member 30 of the guider frame. Displacement of the piston rod 24 produces angular motion of the positioning arm 21, the arms 5 and 7, the shaft 3, and the roll 1, all moving as a unit, about the axis A defined by the bearings 17 and 19. The arms and shaft form a crank unit.

It will be observed that in the preferred construction the axis A intersects the axis B of the shaft 3 at the longitudinal center C of the roll. Thus the roll is effectively pivoted about the center point C, without recourse to the massive structure which would otherwise be necessary to provide for this. The tension reaction moments of the web against the roll therefore counterbalance one another regardless of the angular position of the roll, except to the degree that the tension acting upon opposite edge portions of the web may differ, and so the position is stable.

In a neutral position shown in FIGURE 1, the axis B of the roll 1 extends at right angles to the longitudinal dimension of the sheet 2, and there is no guiding effect on the sheet. A pivoted sensing finger 31 engages one edge of the sheet to detect its position, and remains inactive so long as the sheet does not deviate beyond tolerance limits from its desired path. Other well-known sensing means may be used in place of the finger 31, and these means in themselves form no part of the present invention.

FIGURES 2 and 3 illustrate a corrective guiding action which is applied when the sheet shifts to the left, as seen in FIGURE 2, from its correct path. The sensing finger 31 has swung to the right to follow the sheet edge, causing a control system which will be described hereinafter to operate the positioner 26. The arms 5 and 7 are moved counterclockwise as viewed in FIGURE 3. This tilts the roll 1 clockwise as seen in FIGURE 2, and the angular encounter of the sheet causes it to feed to the right toward its original path, until such time as the sensing finger 31 returns to its original inactive position and causes the actuator 26 to restore the unit to the neutral position of FIGURE 1. A displacement of the sheet to the right in FIGURE 2 results in a counterclockwise tilting of the roll 1 to correct the deviation, in a similar fashion.

The improved guider is particularly adapted to be operated according to the snap-action principles which are explained in detail in the aforementioned copending application Ser. No. 496,244, now Patent No. 3,380,637. To this end, I provide an improved actuator 26 and associated control system illustrated in detail in FIGURES 4–6 in its three working positions. The sensing finger 31 is pivoted as at 29, and is biased lightly against an edge of the sheet 2 by a spring 25; it is displaced by a rightward movement of the sheet 2 to engage a contact L for energizing a solenoid 35, or by a sheet movement to the left to engage a contact R for energizing solenoids 36 and 37. It will be apparent that the spacing between the contacts L and R and the dimensions of the finger 31 determine tolerance limits within which the sheet may wander laterally without producing any control response. In a neutral position shown in FIGURE 4, none of the solenoids are energized. The solenoids control valves 41, 42 and 43, respectively, to connect conduits 27, 32 and 33 to a suitable source of pressure or to exhaust. The valves are biased by springs 44, 45 and 46 toward the positions shown in FIGURE 4, in which the conduits 27 and 33 are pressurized and the conduit 32 is open to exhaust.

The actuator 26 includes a first piston 47 operating in a cylinder 48, and having a coupling rod 49 for acting against a second piston 50 operating in a cylinder 51. The piston 50 is attached to the piston rod 24, connected at 22 to the positioning arm 21 as described previously. In the neutral position of FIGURE 4, pressure in the conduit 27 and cylinder 48 drives the piston 47 to the right against the piston 50, which is driven to the left by pressure received through the conduit 33. In the form shown, the area of the piston 50 is half that of the piston 47, but it has twice the stroke; and the piston 50 is consequently stopped in its midstroke position. The connection of the conduit 32 to exhaust by the valve 43, and the venting of the right end of the cylinder 48 directly to atmosphere through a vent 34, allow the pistons to move rapidly to the positions of FIGURE 4 whenever the sensing finger 31 reaches its inactive position, regardless of the positions from which the pistons start this motion. The guider roll is returned to the neutral position with a rapid snap action and with uniform force, whenever the sheet is restored to its proper path. Any tendency for the guider to overcorrect errors in the sheet position and then to engage in a hunting action is thus minimized.

Referring now to FIGURE 5, it is assumed that the sheet has wandered to the right sufficiently to energize the solenoid 35. This vents the conduit 27 and the left end of the cylinder 48 through the valve 41 and an adjustable needle valve 39. The continuance of fluid pressure in the right end of the cylinder 51 drives both pistons to the left, and the rate of motion is limited only by the rate of escape of fluid from the cylinder 48, which is controlled by the setting of the needle valve 39. Since the motion to the left cannot begin until the pressure in the left end of the cylinder 48 has dropped to substantially half its former value, because of the 2:1 ratio of the piston areas, a pressure relief valve 40 is connected in parallel with the needle valve 39, and is set to exhaust the pressure rapidly until it has reached approximately half the operating pressure level of the source of supply. The valve 40 then closes, and the leftward motion commences with very slight delay after operation of the valve 41.

The displacement shown in FIGURE 5 swings the guider roll to a limiting position opposite to that of FIGURE 2, and it guides the sheet to the left. It is desirable to limit the rate of tilting of the roll from neutral by means of the needle valve 39 in order that small deviations of the sheet, which are quickly corrected by only a partial tilting of the roll, will not cause the roll to reach its full limiting tilted position, which is determined by the full stroke of the piston 50 to the position of FIGURE 5. Excessive tilting tends to cause over-correction and shift the sheet too far in the opposite lateral direction before the roll can be returned to neutral, thus producing a hunting operation. Relatively small errors frequently tend to be of short duration, such as would be caused by irregularities of the edge of the sheet. The control action described minimizes the unnecessary control response resulting from such a condition. However, the tilting motion should take place at a rate sufficiently rapid that large deviations will be subjected to maximum corrective action without any undue delay. Experience with a particular application can readily develop an appropriate compromise between the avoidance of overcorrection of minor deviations, and the prompt initiation of a maximum rate of correction of larger displacements. Selection of an appropriate compromise will not in any case have any effect on the rapid and uniform rate of restoration of the guider roll to the neutral position after the sheet edge has returned to its proper path.

FIGURE 6 illustrates the control action which takes place when the sheet moves to the left beyond the tolerance limit, as viewed in FIGURE 2, and causes the finger 31 to engage the contact R. Before this can take place, the parts are necessarily returned to the neutral condition as in FIGURE 4. Energization of the solenoids 36 and 37 pressurizes the conduit 32 through the valve 43, while exhausting the conduit 33 through the valve 42 and a second adjustable needle valve 38. The unenergized valve 41 continues to supply pressure through the conduit 27 to the cylinder 48, holding the piston 47 at the right end of its stroke just as in the neutral position of FIGURE 4. The piston 50 moves from its previous centered position to the right at a rate which depends on the setting of the needle valve 38, thus driving the guider roll 1 to the position of FIGURES 2 and 3, which restores the sheet to its proper path. Correction of the sheet deviation again restores the system to the neutral condition shown in FIGURE 4.

Figure 8:
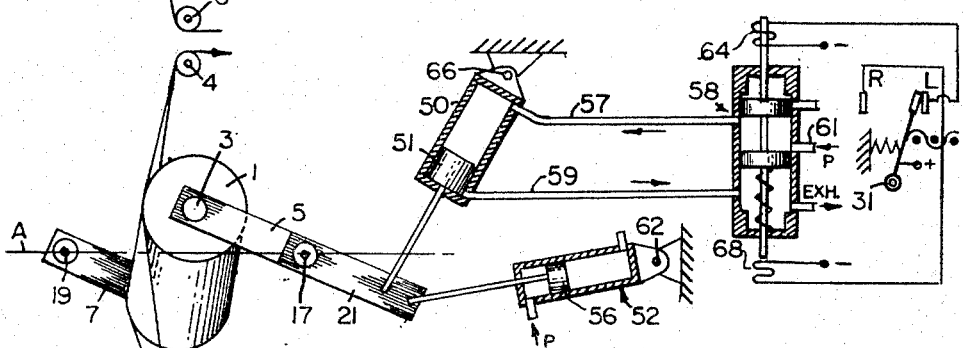
Figure 9:
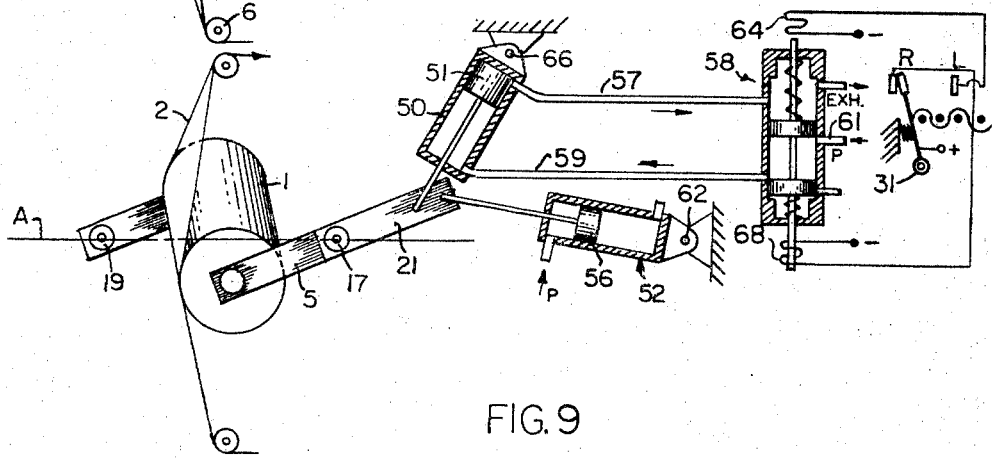

An alternative position-control system is shown schematically in FIGURES 7–9 in its three operating positions, with parts similar to those of the preceding embodiment similarly numbered. Two actuators 50 and 52 are used, the first being of the double-acting type, and the second single-acting. The piston 51 of the actuator 50 is pivotally connected at 53 to the arm 21, while the piston 56 of the actuator 52 is similarly connected at 55. The actuator 52 is continuously pressurized through a conduit 54 to drive its piston 56 to the right as viewed in the drawing; this actuator serves only to center the guide roll to the neutral position when the sensing finger 31 has broken contact as in the neutral position of FIGURE 7. The actuator 50 is at this time exhausted at each end through conduits 57 and 59 and a double solenoid four-way valve 58, so that its piston 51 is free to be driven to a centered position. The actuator 52 is pivotally mounted at 62 on the centerline A of the bearings 17 and 19 about which the roll-and-arm unit turns, so that the system is held in the neutral position shown.

Assuming now that the sheet shifts to the right and the finger 21 engages the contact L, a solenoid 64 is energized to draw the spool of the valve 58 upwardly. This pressurizes the upper end of the actuator 50 through the valve 58 and a conduit 61 connected to a suitable pressure source (not shown). The piston 51 is driven downwardly to produce a clockwise rotation of the arms 5 and 7 and tilt the roll 1 to a limiting position shown in FIGURE 8, which guides the sheet to the left toward its correct path. Some motion of the piston 56 to the left must accompany this action, but the axes of the actuators 50 and 52 are so positioned relative to the axis A that the pressure acting against the piston 56 is easily overcome to this extent, as will be readily apparent from a consideration of the force vectors involved. The piston 51 acts at a large angle to the axis A, while the piston 56 increases its angle from zero to a moderate value.

A deviation of the sheet to the left energizes a solenoid 68 through the contact R, drawing the spool of the valve 58 downwardly and pressurizing the lower chamber of the actuator 50, as shown in FIGURE 9. The arms 5 and 7 are shifted counterclockwise to the limiting position shown, and the sheet is guided to the right toward its proper path.

In the system of FIGURES 7–9, tilting motion of the roll 1 from the neutral position may be limited in rate by use of a needle valve (not shown) in the conduit 61. The return movement to neutral from either tilted position can be more rapid because it is not restrained by the control system; the actuator 50 vents directly to the atmosphere through the control valve 58.

It will be observed that since the ends of the guider roll 1 of FIGURES 1–3 or 7–9 rotate in circular paths about the bearings 17 and 19, as best shown in FIGURE 3, the corrective motion forces one end of the roll somewhat further into the sheet, while the other end is retracted correspondingly. The extent of this displacement is determined by the radii of the arms 5 and 7, and the angular displacements of the limiting positions from the neutral position. Such displacement creates a difference in the tension levels in the opposite edges of the sheet. If the limits of angular displacement of the roll and the level of sheet tension are great enough, and the arms 5 and 7 are of relatively short lengths, this may produce undesirable stretching in some materials, though it is unobjectionable in many cases.

Figure 10:
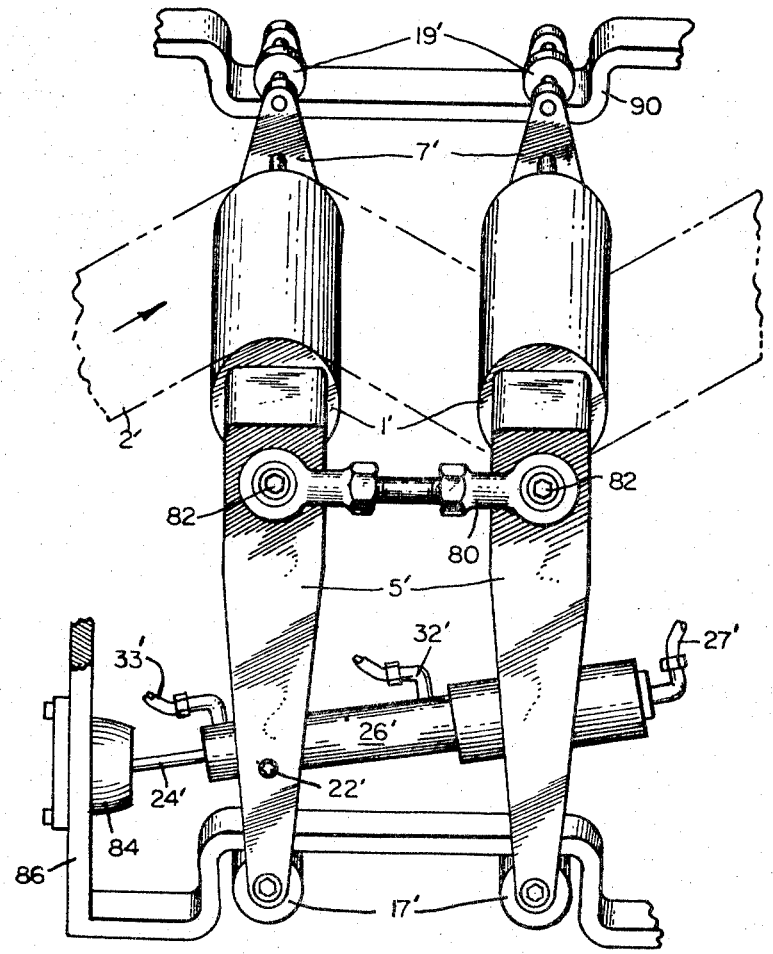
FIGURE 10 is a schematic view showing another construction of a guider.

For those applications in which the differential tensioning effect should be avoided, a modified construction shown in FIGURE 10 is preferred, as it will substantially correct the difficulty. Parts similar to those of FIGURES 1–3 are similarly numbered, with prime superscripts. It will be observed that the shaft-and-arm units are duplicated, and that the two pairs of arms 5' and 7' are coupled to tilt in parallel relation by a turn buckle link 80, which is pivotally connected at 82, 82 to each of the arms 5'. It is not necessary to couple the arms 7', as they will be maintained parallel by the coupling of the arms 5'. The piston rod 24' of the actuator 26' is connected to a frame member 86 by means of a ball joint 84, while the body of the actuator is gimballed in one of the arms 5' by means of a pair of pivots 22' between the arms 5' and a collar (not shown) and a second pair of pivots (not shown) at 90° from pivots 22' between the collar and the actuator 26'. Each of the arms 5' and 7' has parallel legs and takes the form of a U-shaped member, with the free ends of the legs pivotally engaged in ball-and-socket joints provided in hanger eyes 17' or 19' secured to frame members 86 and 90, respectively.

In this construction, both of the rolls act in a similar fashion to guide the sheet 2'. However, since the sheet wraps over one roll and under the other, the tendency to stretch the edges differentially is eliminated; for as an end of one roll is pressed further into the sheet, the corresponding end of the other is withdrawn to an equal extent. Thus the path lengths through the guider of both edges of the sheet remain uniform, and the tension in all parts of the sheet is substantially unaffected by a tilting of the rolls.

In addition to the previously-described advantages of my improved roll apparatus arising from the effective suspension of the roll at its center, it should be noted that it lends itself to use with a position-control system which is entirely located at one side of the mechanism, and therefore is more convenient to install in the crowded locations usually available. The neutral equilibrium of the roll in all positions minimizes the force required to reposition the roll, and the modest mass of the supports reduces the inertia of the guider, both of which factors contribute to its adaptability to a snap-acting mode of operation.

It will be understood that while the illustrated apparatus is arranged for use as a guider, it is also readily adaptable for use as a weft straightener for web materials. However, the web would run generally normal to the plane of the paper in FIGURE 2 instead of generally parallel to it, or vertically in FIGURE 3 instead of horizontally, so that the swinging of the roll would oppositely alter the relative path lengths of the opposite edges of the web between the fixed rolls 4 and 6 for weft-straightening action. Specifically, the bisector of the wrap angle of the web about the roll would be substantially perpendicular to the crank arms 5 and 7 with the roll in a neutral position. A larger angle of wrap than is shown in FIGURE 3 would normally be used for weft-straightening.

While I have described preferred embodiments of my improved roll apparatus by way of illustration, it will be apparent to those skilled in the art that various changes and modifications may be made therein without departing from the true spirit and scope of the invention, which I therefore intend to define in the appended claims without limitation to the details of the foregoing embodiments.

What I claim is:

1. Sheet-treating roll apparatus comprising: at least one roll for engaging a longitudinally-travelling sheet wrapped partially about said roll;
   a crank unit including shaft means extending along a first axis and mounting said roll for rotation thereabout, and a pair of arms extending transversely from opposite ends of said shaft with opposite components of direction;
   means supporting said crank unit for rotation about a second axis inclined to said first axis;
   and means for angularly positioning said crank unit about said second axis to adjust the inclination of said roll to the travelling sheet.

2. Apparatus as recited in claim 1, in which said positioning means includes control means for selectively limiting the rate of angular displacement of said shaft and arms from a neutral position of said roll, and for restoring said shaft and arms to said neutral position at a uniform rate independent of the selected rate of displacement from said neutral position.

3. Apparatus as recited in claim 1, in which said positioning means comprise an actuator having a first actuating element drivingly connected with one of said arms and movable through a stroke, and a second actuating element movable between a first limiting position interfering with the stroke of said first element at substantially half the length of said stroke, and a second position withdrawn from the stroke of said first element;
   together with sheet position detecting means; and a control system connected for control by said sheet position detecting means to selectively energize said first and second elements;
   said control system being operative in response to detection of location of said sheet in a predetermined path to drive said second element to said first interfering position and said first element against said second element to center said first element in its stroke and drive said arms and shaft to a neutral position in which said roll extends at right angles to the direction of travel of said sheet;
   and said control system being operative in response to detection of deviation of said sheet from said predetermined path to position said second element in non-interfering relation to said first element, and to drive said first element to one of two alternative limits of its stroke selected to tilt said roll in a sense to guide said sheet toward said predetermined path.

4. Apparatus as recited in claim 1, in which said arms extend in diametrally-opposed relation from said shaft axis, and said second axis intersects said shaft axis at the longitudinal center of said roll, whereby said roll is supported in neutral equilibrium for angular displacement about said center.

5. A sheet guider as recited in claim 1, in which said positioning means comprise control means, and first and second actuators each drivingly connected with one of said arms;
   said first actuator being operable to continuously bias said arms, shaft, and roll yieldably toward a neutral position of said roll;
   said control means being constructed and arranged to energize said second actuator in response to displacement of said sheet in either lateral direction from a predetermined path to tilt said arms and roll to either of two limiting positions of opposite angular sense for restoring the sheet to its predetermined path, and to deenergize said second actuator in response to a return of the sheet to its predetermined path for restoration of said roll by said first actuator to said neutral position.

6. Apparatus as recited in claim 5, in which said first actuator is pivotally supported along said second axis and said second actuator is pivotally supported in spaced-apart relation to said second axis, whereby the continuous bias of said first actuator imposes only limited restraint against operation of said second actuator when the latter is energized.

7. Sheet-treating roll apparatus comprising: a pair of rolls for guiding a longitudinally-travelling sheet of material serially wrapped partially about said rolls;
   a pair of shafts each supporting one of said rolls for rotation about a longitudinal axis thereof;
   two pairs of arms each pair being affixed to opposite ends of one of said shafts and each extending transversely from the axis of the corresponding shaft with opposite components of direction;
   two pairs of bearing support means each supporting one of said pairs of arms and one of said shafts affixed thereto, for angular displacement as a unit about a second fixed axis inclined to said axis of the affixed shaft, the second axes of the two pairs of bearing support means being mutually parallel;
   means interconnecting said arm and shaft units to maintain said shaft axes in parallel relation;
   and means for angularly positioning said units each about a corresponding one of said second axes to adjust the inclination of said rolls to the travelling sheet.

8. Apparatus as recited in claim 7, together with means for directing the travelling sheet to and about a surface portion of one of said rolls and thence to and about an oppositely-facing surface portion of the other of said rolls.

9. Sheet-treating roll apparatus comprising: a roll for guiding a longitudinally-travelling sheet of material wrapped partially about said roll;
   means supporting said roll for tilting movement in alternative angular senses to and from a neutral position extending substantially at right angles to the direction of travel of said sheet;
   and positioning means comprising an actuator having a first actuating element drivingly connected with said roll and movable through a stroke, and a second actuating element movable between a first position interfering with the stroke of said first element at substantially half the length of said stroke, and a second position withdrawn from the stroke of said first element;
   together with sheet position detecting means; and a control system connected for control by said sheet position detecting means to selectively energize said first and second elements;
   said control system being operative in response to detection of location of said sheet in a predetermined path to drive said second element to said first interfering position and said first element against said second element, to center said first element in its stroke and drive said roll to a neutral position extending at right angles to the direction of travel of said sheet;

and said control system being operative in response to detection of deviation of said sheet from said predetermined path to position said second element in noninterfering relation to said first element, and to drive said first element to one of two alternative limits of its stroke selected to tilt said roll in a sense to guide said sheet toward said predetermined path.

References Cited

UNITED STATES PATENTS 2,484,473  10/1949  Staege _____ 226—23 X

ALLEN N. KNOWLES, *Primary Examiner.*